(12) United States Patent  (10) Patent No.: US 8,397,877 B2
Mival et al.  (45) Date of Patent:  Mar. 19, 2013

(54) WHEEL BRAKING MECHANISM

(76) Inventors: Nicholas James Mival, Ibstone (GB); Andrew Gordon Wallace, Nr. Newent (GB)

( * ) Notice: Subject to any disclaimer, the term of this patent is extended or adjusted under 35 U.S.C. 154(b) by 329 days.

(21) Appl. No.: 12/565,844

(22) Filed: Sep. 24, 2009

(65) Prior Publication Data

US 2010/0072004 A1  Mar. 25, 2010

(30) Foreign Application Priority Data

Sep. 25, 2008 (GB) .................................. 0817565.5

(51) Int. Cl.
*B60T 1/02* (2006.01)
*B62B 9/08* (2006.01)

(52) U.S. Cl. ............... 188/17; 188/19; 188/20; 188/31; 188/72.7

(58) Field of Classification Search ............... 188/9, 17, 188/19, 20, 21, 22, 31, 2 F, 265, 71.1, 72.1, 188/72.3, 72.7, 72.9
See application file for complete search history.

(56) References Cited

U.S. PATENT DOCUMENTS

| | | | |
|---|---|---|---|
| 809,341 A * | 1/1906 | Viola | 188/31 |
| 1,221,435 A * | 4/1917 | Frykberg | 188/31 |
| 1,735,541 A | 12/1929 | Miller | |
| 3,842,947 A * | 10/1974 | Hofmann | 188/69 |
| 6,269,917 B1 | 8/2001 | Harting | |
| 6,286,633 B1 * | 9/2001 | Kim | 188/69 |
| 6,378,663 B1 | 4/2002 | Lee | |
| 7,140,483 B2 * | 11/2006 | Kramer et al. | 188/31 |
| 2004/0187620 A1 | 9/2004 | Newman | |

FOREIGN PATENT DOCUMENTS

| | | |
|---|---|---|
| DE | 102007035748 | 2/2009 |
| EP | 0650854 A | 5/1995 |
| GB | 2431624 | 5/2007 |
| WO | WO95/31650 | 11/1995 |

* cited by examiner

*Primary Examiner* — Thomas J Williams
(74) *Attorney, Agent, or Firm* — Gordon & Jacobson, PC

(57) ABSTRACT

A wheel braking mechanism 10 comprising a brake shaft 14, a brake drum 16, an engagement pedal 18 and a disengagement pedal 20. The brake shaft 14 has a plurality of first splines 22 provided around the brake shaft 14. A first alignment member 24 is provided at the end of each first spline 22 and has first and second oppositely directed chamfered alignment surface 24a, 24b. The brake drum 16 defines a brake socket around which are provided a plurality of second splines 28, which define a plurality of spline recesses 30. A second alignment member 31 is provided at the opposing end of each second spline 28. Movement of the brake shaft 14 towards the brake drum 16 causes the first alignment members 24 to travel down the respective alignment surfaces of the second alignment members 31, thereby aligning the first splines with the respective adjacent spline recess 30.

16 Claims, 7 Drawing Sheets

WHEEL BRAKING MECHANISM

CROSS REFERENCE TO RELATED APPLICATION

This application claims priority from Great Britain Application No. 0817565.5 filed on Sep. 25, 2008, herein incorporated by reference in its entirety.

BACKGROUND OF THE INVENTION

1. Field of the Invention

The invention relates to a wheel braking mechanism, and specifically, but not exclusively, to a wheel braking mechanism for a pushchair.

2. State of the Art

Braking mechanisms on pushchair wheels typically comprise an axial brake pin which may be selectively brought into engagement with one of a plurality of axial pin sockets provided on the wheel hub or a radial brake drop pin which may be brought into engagement with an open gear provided radially on the wheel hub. These existing braking mechanisms suffer from the problem that when the wheel is stopped, the brake pin may not be aligned with one of the pin sockets or between gear teeth, making engagement of the brake difficult and requiring rocking of the wheel to align the pin and the socket. A parent often has to rotate the wheel during application of the brake in order to align the pin and the socket. A further problem that known brakes suffer from is that the pin may be sheared off while it is engaged with a pin socket if the wheel is rotated while the brake is engaged, due to the low contact area between the pin and the socket resulting in high local stresses being applied to the pin if the wheel is rotated; this often happens due to a parent rocking the wheel with their foot while the pushchair is stationary with the brake applied.

SUMMARY OF THE INVENTION

According to an aspect of the present invention there is provided a wheel braking mechanism comprising:

a first brake member comprising one of a brake shaft and a brake drum and a second brake member comprising the other of a brake shaft and a brake drum, the brake shaft and the brake drum being co-axially aligned with one another, the first brake member having a first spline provided thereon;

the second brake member having a plurality of second splines provided thereon, the second splines being arranged on the second brake member to thereby define a plurality of spline recesses adapted to receive at least part of the first spline;

a first alignment member provided on the first spline and projecting outwardly therefrom;

a corresponding plurality of second alignment members provided on the second splines, each second alignment member projecting outwardly from the respective second spline, the alignment members each comprising first and second oppositely directed chamfered alignment surfaces, to thereby give the alignment members generally triangular sectional profiles, and the first brake member being axially movable between an engaged position in which the first spline is at least partly received by a spline recess and engages with an adjacent second spline, and a disengaged position in which the first spline is spaced from the spline recesses; and brake actuation means operable to axially move the first brake member between the engaged and disengaged positions, wherein as the first brake member is moved towards the engaged position, the first alignment member comes into contact with a second alignment member, continuing movement of the first brake member towards the engaged position causing the first alignment member to travel down the respective chamfered alignment surface of the second alignment member, thereby aligning the first spline into the adjacent spline recess.

The engagement between the first brake member and the second brake member, i.e. the engagement of the first spline in a spline recess, is a more robust brake engagement than is provided by the pin and socket type brakes, due to a larger contact area existing between the first and second splines. A significantly higher force (typically higher than the force that could be generated by a user rocking the wheel with their foot) would therefore be required in order to sheer the first spline and/or the second spline against which it is engaged. The first and second alignment members ensure that the first spline is easily and controllably guided into the nearest spline recess no matter what the position of the first spline relative to the spline recess at the point that the brake is actuated. The first brake member is therefore smoothly brought into engagement with the second brake member during actuation of the brake, without requiring any intervention from the user.

Axial engagement of the brake members is advantageous because it enables the braking mechanism to be of a compact size and contained within the area of the wheel. It also enables engagement to be provided between the first and second brake members at multiple points, at any radial position around the hub of the wheel. Preferably, the first brake member is configured to be coupled to a vehicle frame and the second brake member is configured to be provided on a vehicle wheel at or around the wheel hub. The vehicle is preferably a pushchair, a stroller or a pram.

The second brake member therefore rotates with the wheel and the first brake member is axially movable relative to the vehicle frame between two fixed points, namely the engaged and disengaged positions.

Preferably, a plurality of first splines are provided on the first brake member and a corresponding plurality of first alignment members are provided on the first splines, each first alignment member projecting outwardly from its respective first spline. The strength of the engagement between the first brake member and the second brake member is increased by the greater number of first splines but the same smooth, while controlled engagement between the brake members is maintained due to the presence of the corresponding plurality of first alignment members, each first alignment member coming into contact with and being guided into alignment by a respective second alignment member.

Preferably, the first brake member comprises the brake shaft with the or each first spline being provided externally around the brake shaft, and the second brake member comprises the brake drum defining a brake socket, with the second splines being provided internally around the brake drum.

Alternatively, the first brake member may comprise the brake drum defining a brake socket with the or each first spline being provided internally around the brake drum, and the second brake member comprises the brake shaft, with the second splines being provided externally around the brake shaft.

The brake shaft is preferably substantially received within the brake drum in the engaged position.

The first splines are preferably arranged in an abutting series around at least part of the first brake member, and most preferably all the way around the first brake member. The second splines are preferably arranged in an abutting series around the second brake member such that a series of complementary profiled spline recesses are provided for receiving the first splines.

Preferably, the number of spline recesses is equal to the number of first splines.

A substantially 360 degrees engagement is thereby provided between the first brake member and the second brake member, giving a strong lock therebetween.

The or each first spline and each second spline preferably has a generally triangular sectional profile, thereby defining first and second oppositely directed engagement surfaces. A triangular profile maximises the engagement surface area while minimising the amount of material required to form the splines.

The first brake member may comprise a plurality of parts which together form the first brake member. The second brake member may comprise a plurality of parts which together form the second brake member, each part having one or more second splines provided thereon.

The first and second chamfered alignment surfaces preferably have an angle of inclination of between 40 degrees and 50 degrees, and most preferably substantially 45 degrees. Providing the chamfered alignment surfaces at these angles gives the easiest alignment between the first and second alignment members, while providing good strength to the alignment members.

The brake actuation means is preferably further operable to selectively retain the first brake member in the engaged and disengaged positions. The brake actuation means is preferably operable to cause reciprocal axial movement of the first brake member towards and away from the second brake member.

The brake actuation means preferably comprises an engagement actuator movable into a brake engaged position, movement of the actuator causing the first brake member to be moved from its disengaged position to its engaged position. Preferably, the brake actuation means further comprises a disengagement actuator movable into a brake release position, movement of the actuator causing the first brake member to move from its engaged position to its disengaged position. The engagement and disengagement actuators preferably comprise foot operable pedals or buttons provided near a wheel. Both actuators may be provided near one wheel or one actuation may be provided near one wheel and the other actuator provided near the other wheel. The engagement and disengagement actuators may alternatively comprise manually operable levers or buttons provided remote from the wheels.

The braking mechanism preferably further comprises locking means operable to retain the first brake member in the engaged position. The locking means preferably comprises a ratchet mechanism, location of the first brake member into its engaged position engaging the ratchet mechanism and locking the first brake member in its engaged position and movement of the off lever releasing the ratchet mechanism and allowing the first brake member to return to its disengaged position. The braking mechanism is thereby engaged and locked in a single action and unlocked and disengaged in a subsequent single action.

The wheel braking mechanism may further comprise a third brake member of the same type as the first brake member, and a fourth brake member of the same type as the second brake member, the third and fourth brake members being co-axially aligned with one another and the third brake member being axially movable between an engaged position and a disengaged position as described above in relation to the first brake member, the brake actuation means being further operable to move the third brake member between the engaged and disengaged positions. The braking mechanism preferably further comprises second locking means of the same type as the locking means and operable to retain the third brake member in the engaged position.

Embodiments of the invention will now be described in detail, by way of example only, with reference to the accompanying drawings.

DETAILED DESCRIPTION OF THE PREFERRED EMBODIMENTS

Figure 1:
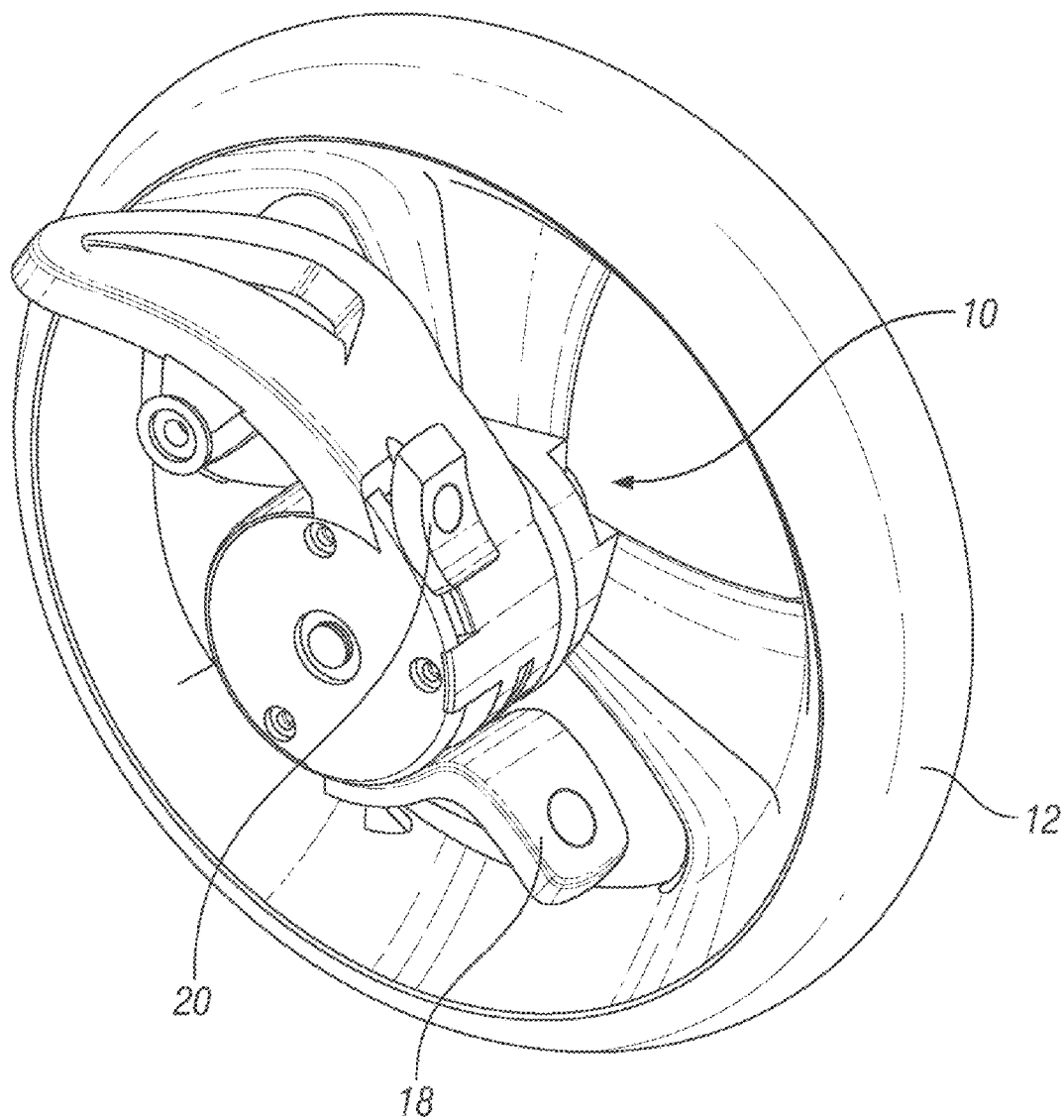
FIG. 1 is a diagrammatic representation of a wheel braking mechanism according to a first embodiment of the invention, shown provided on a pushchair.
Figure 2:
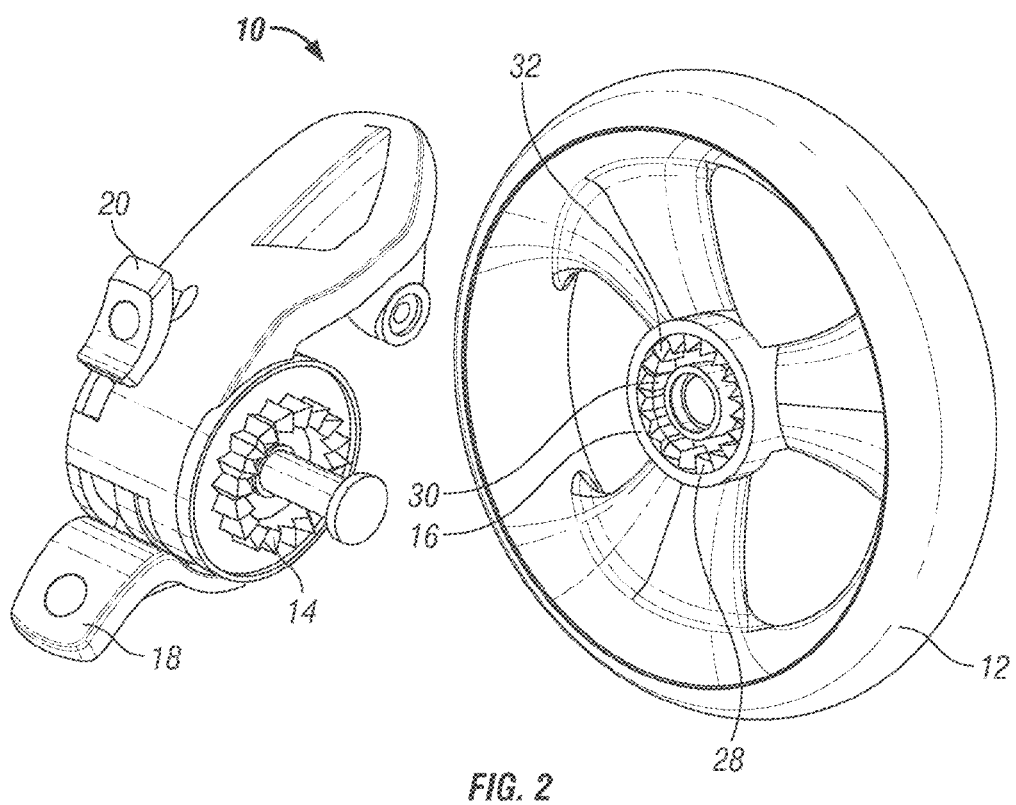
FIG. 2 is a part exploded diagrammatic representation of the wheel braking mechanism of FIG. 1.
Figure 3:
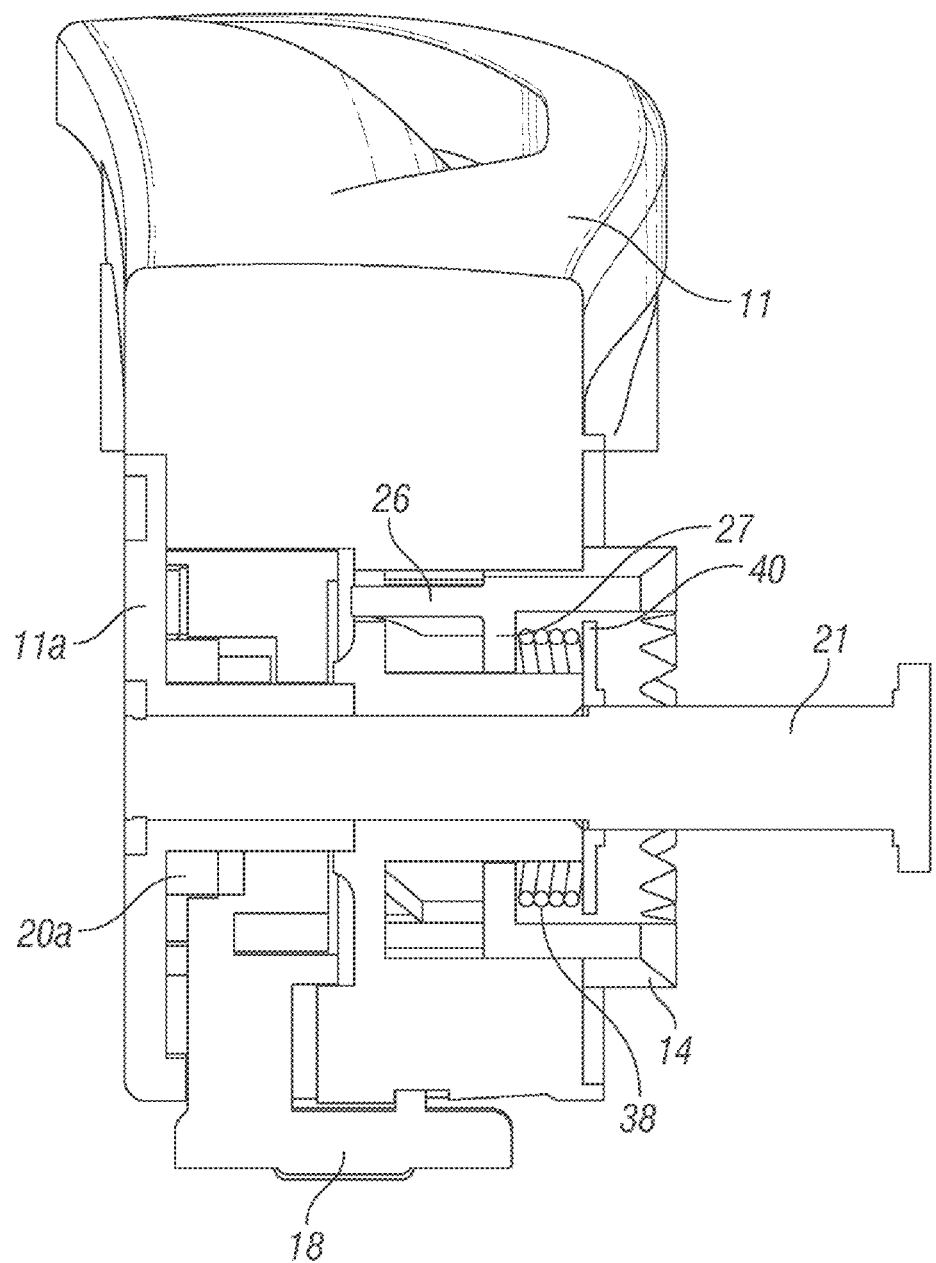
FIG. 3 is diagrammatic part-sectional view along line B-B of FIG. 2.
Figure 4:
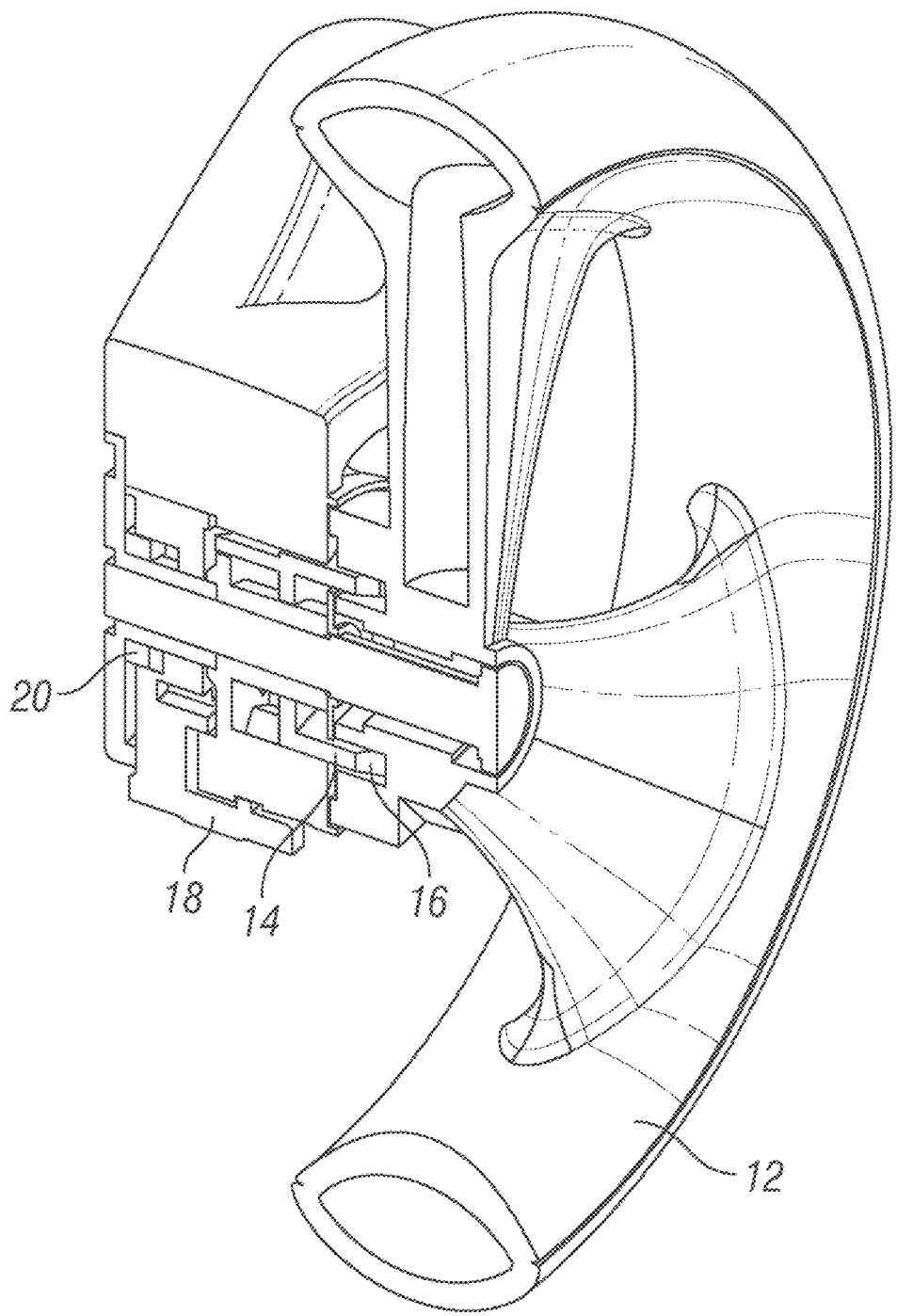
FIG. 4 is a diagrammatic part-sectional rotated view along line A-A of FIG. 1.

Referring to FIGS. 1 to 6, a first embodiment of the invention provides a wheel braking mechanism 10 shown provided on a wheel 12. The braking mechanism 10 comprises a first brake member in the form of a brake shaft 14, a second brake member in the form of a brake drum 16, and actuation means, including an engagement (brake on) pedal 18 and a disengagement (brake off) pedal 20.

The brake shaft 14, on pedal 18, and off pedal 20 are provided within a brake housing 11, and are mounted on a central arm 21.

Figure 6A:
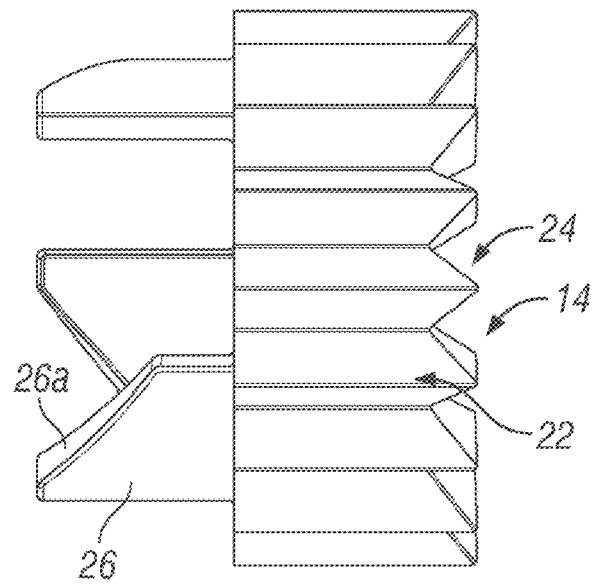
FIG. 6a is a diagrammatic side view of the brake shaft of FIG. 1.
Figure 6B:
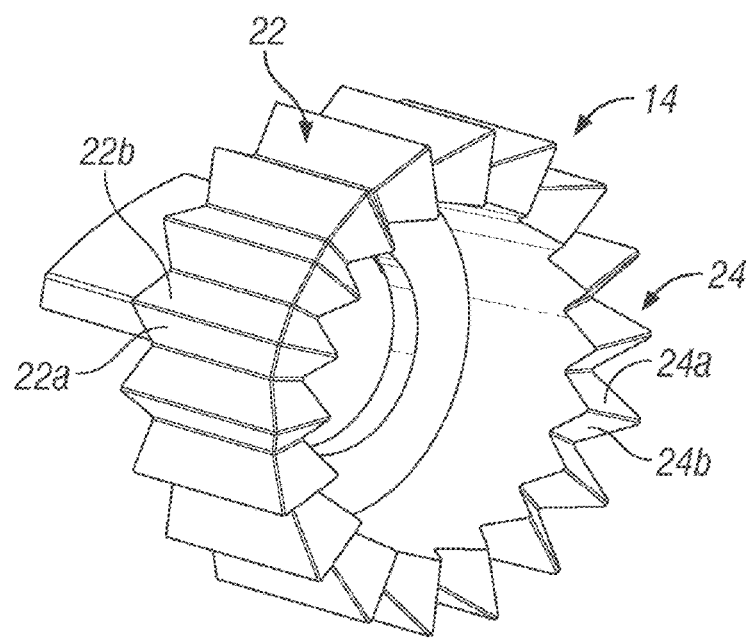
FIG. 6b is a diagrammatic isometric view of the brake shaft of FIG. 1.

The brake shaft 14 has a plurality of first splines 22 provided in an abutting series externally around the brake shaft 14. The first splines 22 have a generally triangular sectional profile, thereby giving each first spline 22 two engagement surfaces 22a, 22b. A first alignment member 24 is provided at the distal end of each first spline (as seen best in FIG. 6). The alignment members 24 each have first and second oppositely directed chamfered alignment surfaces 24a, 24b. The alignment surfaces 24a, 24b each have an angle of inclination of approximately 45 degrees, thereby giving the alignment members a generally triangular profile (as seen in FIG. 6(b)).

The brake shaft 14 is provided at its other (coupling) end with a spaced set of three drive legs 26, which have chamfered sections 26a at their distal ends, and a spring seat 27.

The brake drum 16 defines a brake socket around which are provided a plurality of second splines 28 provided in an abutting series fully around the internal surface of the brake socket. The brake shaft 14 and the brake drum 16 are co-axially aligned, about the central arm 21. The second splines 28 define a plurality of spline recesses 30 of a complementary profile and number to the first splines 22, such that the first splines may be substantially received within respectively located spline recesses 30. Each second spline 28 has a generally triangular sectional profile, thereby giving each second spline 28 two engagement surfaces, to engage with correspondingly located engagement surfaces on the first splines 22. A second alignment member is provided at the opposing distal end of each second spline 28. The second alignment members are of the same size, shape and configuration as the first alignment members 24 described above and shown in detail in FIGS. 6a and 6b.

Figure 5:
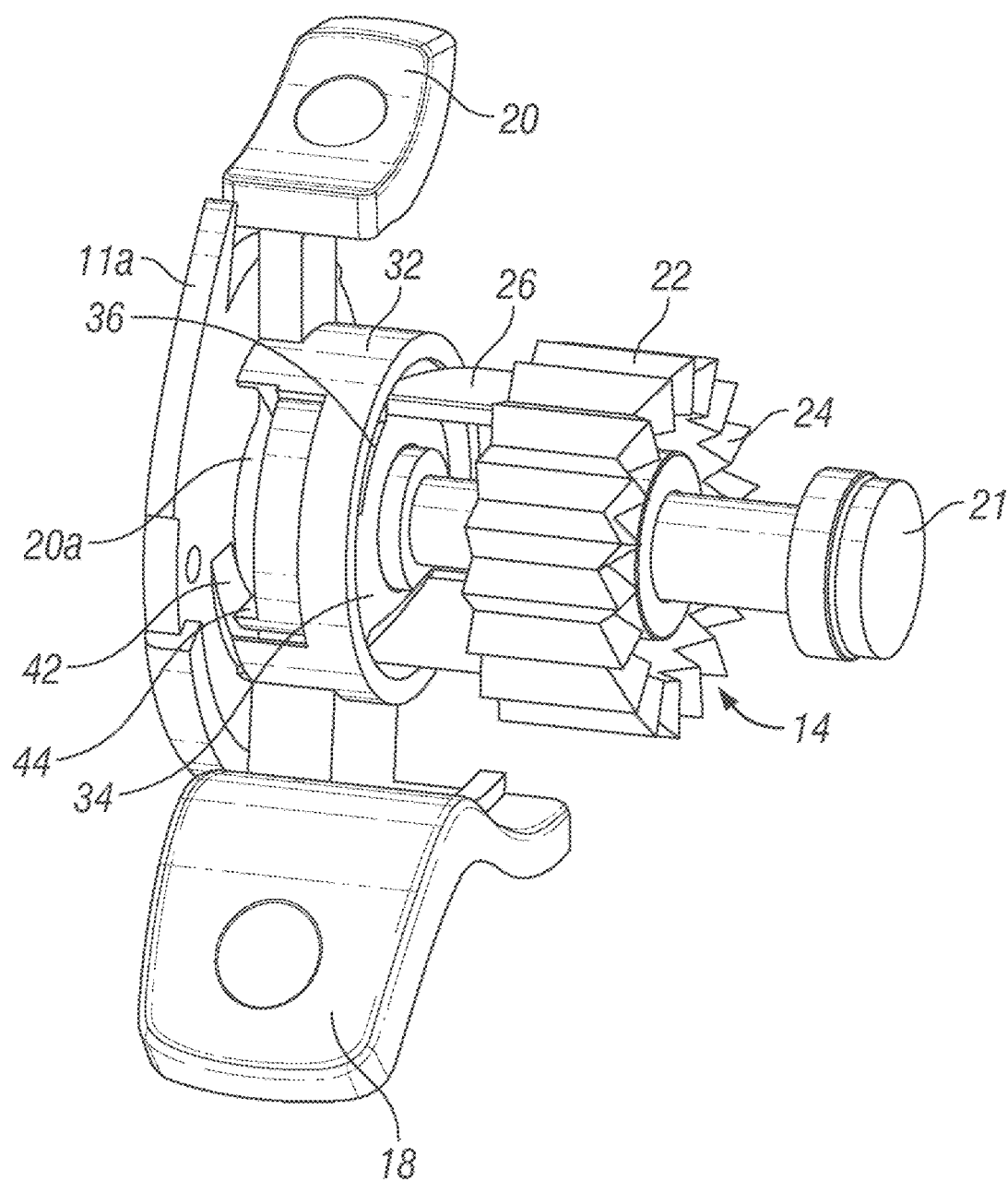
FIG. 5 is a diagrammatic representation of the brake shaft, on lever and off lever of the brake mechanism of FIG. 1.

As shown in FIG. 5, the on pedal 18 is mounted on an actuation drum 32, which is mounted about the central arm 21. The actuation drum 32 is movable by a small amount backwards and forwards along the drive arm 21. The actuation drum 32 is provided on one end with a drive surface 34 in which three apertures 36 are formed, in which the legs 26 of the drive arm 14 are received. Each aperture 36 is provided with an angled drive cam surface which engages with the chamfered sections 26a on the legs 26. In operation, as the pedal 18 is moved down (as shown in the drawings), the actuation drum 32 rotates anti-clockwise, causing the cam surfaces to drive against the legs 26, causing the legs 26 to move outwardly from the drive surface 34, thereby moving the brake shaft 14 linearly towards its engaged position and the brake hub 16.

A compression spring 38 is provided between a washer 40 mounted on the central arm 21 and the spring seat 27 of the brake shaft 14. The spring 38 biases the brake shaft 14 towards its disengaged position. Operation of the on pedal 18 moves the brake shaft 14 towards its engaged position, against the action of the spring 38.

The actuation means further comprises a ratchet locking mechanism in the form of a first ramp 42 provided on a side plate 11a of the housing 11 and a first foot 44 which projects from the other end (furthest left in the drawings) of the actuation drum 32. The spring 38 biases the foot 44 into a position adjacent the side plate 11a. As the on pedal 18 is moved down, and the drum 32 is caused to rotate anti-clockwise, the foot 44 travels up the ramp 42, pushing the drum away from the side plate 11a, against the action of the spring 38. When the on pedal 18 reaches its fully on position, in which the drive shaft 14 is in its engaged position, the foot 44 falls off the end of the ramp 42. The action of the spring 38 returns the drum 32 back to its position adjacent the side plate 11a, causing the foot 44 to engage against the end of the ramp 44, brake on position.

The off pedal 20 is mounted on an actuation disc 20a, which is mounted on the central arm 21. The actuation means further comprises ratchet unlocking means comprising a second ramp (not visible in the drawings) provided on the off pedal actuation disc 20a, arranged to engage with a second foot (not visible in the drawings) provided on the actuation drum 32. When the off pedal 20 is pushed upwards and clockwise (as shown in the drawings), the second ramp engages with the second foot and drives the actuation drum 32 away from the side plate 11a, such that the first foot 44 is moved outwardly and onto the end of the first ramp 42. The action of the spring 38 pushes the actuation drum 32 back towards the side plate 11a, causing the first foot 44 to travel back down the first ramp 42, and the actuation drum 32 and on pedal to rotate clockwise back to their disengaged positions. The action of the spring 38 also causes the brake shaft 14 to be moved back towards the action drum 32 and thus into the disengaged position.

In operation, to engage the brake locking mechanism 10, a user pushes the on pedal 18 down causing the brake shaft 14 to move (right as shown in the drawings) towards and into the brake drum 16. During the engaging movement the first alignment members 24 will typically come into contact with the second alignment members 31. Continued movement of the brake shaft 14 towards the brake drum 16 results in the first alignment members 24 to travelling down the respective chamfered alignment surfaces of the second alignment members 31, thereby aligning the first splines with the respective adjacent spline recess 30. The first splines 22 are thereby aligned with their respective spline recesses 30 and continued movement of the brake shaft 14 towards the brake drum 16 causes the first splines 22 to be pushed into the spline recesses 30. When the on pedal reaches it fully on position the ratchet locking means 42, 44 will engage and lock the on pedal 18 and the brake shaft 14 in the engaged, brake on position.

It will be appreciated that, occasionally, the first alignment members 24 and the first splines 22 will be correctly aligned with the spline recesses 30 when the on pedal 18 is operated, so the first splines 22 will be directly pushed in to the respective spline recesses 30.

In the engaged position, the engagement surfaces of the first and second splines 22, 28 engage with one another and provide a large total engagement surface, to prevent rotation of the wheel 12 while the braking mechanism 10 is engaged.

To release the braking mechanism 10, the user pushes the off pedal 20 generally upwards/clockwise, causing the ratchet unlocking mechanism to release the ratchet locking mechanism 42, 44, resulting in the brake shaft 14 moving out of the brake drum 16, under the action of the spring 38, and returning to its disengaged position, removed from the brake drum 16. The spring 38 also causes the on pedal 18 to rotate back to its starting position.

Figure 7:
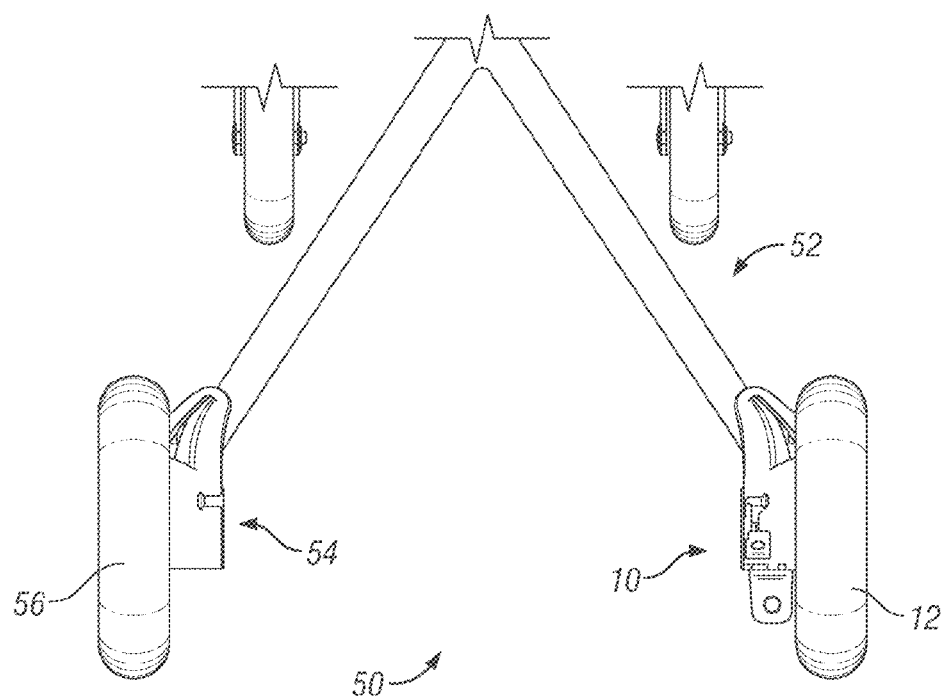
FIG. 7 is a diagrammatic representation of a brake mechanism according to a second embodiment of the invention, shown on the rear wheels of a pushchair.

Referring to FIG. 7, a second embodiment of the invention provides a braking mechanism 50 which is substantially the same as the braking mechanism 10 of the first embodiment, with the following modifications. The same reference numbers are retained.

In this embodiment, the braking mechanism 50 comprises a master (first) braking mechanism 10 provided on one rear wheel 12 of a pushchair 52 and a slave (second) braking mechanism 54 provided one the other rear wheel 56.

The slave braking mechanism 54 is of substantially the same construction as the master braking mechanism 10, being provided with a third brake member in the form of a second brake shaft 14 and a fourth brake member in the form of a second brake drum 16, with the modification that it is not provided with an on pedal, off pedal, ratchet locking means and ratchet unlocking means. Movement of the second brake shaft 14 of the slave braking mechanism 54 is controlled by means of coupling wires which mechanically couple its movement to that of the brake shaft 14 in the master braking mechanism 10. The coupling wires run through the rear legs 58 of the pushchair 52 and are constructed and operate in the same manner as for other known pushchairs having brake on and off pedals provided on one wheel which control braking mechanisms on both wheels. Such coupling mechanisms will be well known to the person skilled in the art and so will not be described in detail here.

The described embodiments provide the advantages of a braking mechanism having a strong mechanical engagement between the brake shaft and brake drum as a result of the large effecting coupling surface area between the engagement surfaces of the first and second splines. The strength of the engagement is further enhanced by the substantially 360 degree engagement between the brake shaft and the brake drum. The first and second alignment members ensure that no matter what the relative orientation of the brake shaft and the brake drum when the brake mechanism is operated, by pushing the on pedal, the first splines are smoothly brought into alignment with the respective spline recesses, thereby overcoming the problem of known pin and socket type braking mechanism where the pin is often misaligned with the socket and it is difficult to engage the braking mechanism. Due to the triangular sectional profile of the alignment members, there is very little face to face surface area (only the points of the alignment members) so the braking mechanism will not jam during actuation; should the first and second brake members be orientated so that the points of the alignment members are aligned, the very small size of the engagement area between them means that any such engagement will be unstable and will tend to disengage, resulting in the first alignment members moving into contact with one of the chamfered alignment surfaces of the respective second alignment members, and the engagement of the brake members then being able to proceed smoothly.

Various modifications may be made to the described embodiments without departing from the scope of the invention. The first brake member may be provided with a different number of first splines, which may be provided in a different configuration to that shown. In particular, a smaller number of first splines may be provided and may be arranged around only part of the first brake member. Where the first brake member is described as a brake shaft and the second brake member is described as a brake drum, the first brake member may alternatively be a brake drum and the second brake member a brake shaft. The first and second splines, and the spline recesses, may be of a different sectional profile to that shown. The first and second brake members may alternatively be formed from a plurality of segment parts, and each segment may be provided with one or more splines. The first and second alignment members may be of a different shape to that shown, and in particular the chamfered alignment surfaces may have a different angle of inclination to that described. The actuation means may be of a different type and configuration to that described.

What is claimed is:

1. A wheel braking mechanism for a pushchair, stroller or baby carriage that includes a frame as well as a wheel with an associated hub, the braking mechanism comprising:
   a first brake member including one of a brake shaft and a brake drum, the first brake member having a first spline provided thereon, and the first brake member being configured to be coupled to the frame;
   a second brake member including the other of the brake shaft and the brake drum, the brake shaft and the brake drum being co-axially aligned, the second brake member having a plurality of second splines provided thereon, the plurality of second splines being arranged on the second brake member to define a plurality of spline recesses adapted to receive at least a part of the first spline, the second brake member being configured to be provided on the wheel at or around the hub and to rotate with the wheel;
   a first alignment member provided on the first spline and projecting outwardly therefrom;
   a plurality of second alignment members corresponding to and provided on the plurality of second splines, each second alignment member projecting outwardly from the respective second spline, the alignment members each comprising first and second oppositely directed chamfered alignment surfaces oriented to give each alignment member a generally triangular profile; and
   a brake actuation means operable to axially move the first brake member between an engaged position and a disengaged position;
   wherein in the engaged position, the first spline is at least partly received within a particular spline recess and engages with an adjacent second spline to brake the wheel, and in the disengaged position, the first spline is spaced from the plurality of spline recesses; and
   wherein movement of the first brake member toward the engaged position causes the first alignment member to contact a particular second alignment member and to travel along the respective chamfered alignment surfaces of the particular second alignment member, thereby causing relative rotation between the first brake and the second brake member to align the first spline into an adjacent spline recess.

2. A wheel braking mechanism according to claim 1, wherein:
   a plurality of first splines are provided on the first brake member and a corresponding plurality of first alignment members are provided on the first splines, each first alignment member projecting outwardly from a respective first spline.

3. A wheel braking mechanism according to claim 2, wherein:
   the first splines are arranged in a first abutting series around at least part of the first brake member, the second splines are arranged in a second abutting series around the second brake member, and the second splines define a series of complementary profiled spline recesses for receiving the first splines.

4. A wheel braking mechanism according to claim 2, wherein:
   each first alignment member projects outwardly from the respective first spline in a direction parallel to the rotational axis of the wheel.

5. A wheel braking mechanism according to claim 2, wherein:
   the plurality of first alignment members are distributed about a circumference that encircles the rotational axis of the wheel.

6. A wheel braking mechanism according to claim 1, wherein:
   the first brake member includes the brake shaft, and each first spline is provided externally around the brake shaft, and
   wherein the second brake member includes the brake drum, the brake drum defines a brake socket, and the second splines are provided internally around the brake drum.

7. A wheel braking mechanism according to claim 1, wherein:
   the first brake member includes the brake drum, the brake drum defines a brake socket, and the first spline is provided internally around the brake drum, and
   wherein the second brake member includes the brake shaft, and the second splines are provided externally around the brake shaft.

8. A wheel braking mechanism according to claim 1, wherein:
   the brake shaft is substantially received within the brake drum in the engaged position.

9. A wheel braking mechanism according to claim 1, wherein:
   the first and second chamfered alignment surfaces have an angle of inclination in the range of 40 to 50 degrees.

10. A wheel braking mechanism according to claim 1, wherein:

the brake actuation means includes an engagement actuator movable into a brake engaged position, and a disengagement actuator movable to a brake release position, and wherein movement of the engagement actuator toward the brake engaged position causes the first brake member to be axially moved from the disengaged position to the engaged position, and movement of the disengagement actuator toward the brake release position causes the first brake member to axially move from the engaged position to the disengaged position, the engagement and disengagement actuators operable in generally opposite directions.

11. A wheel braking mechanism according to claim 1, further comprising:

a locking means operable to retain the first brake member in the engaged position and to release the first brake member from the engaged position, the locking means including a ratchet mechanism for engaging and locking the first brake member in the engaged position, and an off lever for releasing the ratchet mechanism and allowing the first brake member to return to the disengaged position.

12. A wheel braking mechanism according to claim 1, wherein:

the first alignment member projects outwardly from the first spline in a direction parallel to rotational axis of the wheel, and each second alignment member projects outwardly from the respective second spline in a direction parallel to the rotational axis of the wheel.

13. A wheel braking system according to claim 1, wherein:

the plurality of second alignment members are distributed about a circumference that encircles the rotational axis of the wheel.

14. A pushchair, stroller or baby carriage comprising:

a frame;

a first wheel with an associated hub; and a first braking mechanism according to claim 1 for braking the first wheel.

15. A pushchair, stroller or baby carriage according to claim 14, further comprising:

a second wheel and associated hub; and a second braking mechanism according to claim 1 for braking the second wheel.

16. A pushchair, stroller or baby carriage according to claim 15, wherein:

the first and second braking mechanisms are configured to cooperate with one another such that braking of one of the first and second wheels causes braking of the other of the first and second wheels.

* * * * *